July 24, 1928. 1,678,279

B. A. BRANCH ET AL

SAW FILING MACHINE

Filed Feb. 15, 1927  2 Sheets-Sheet 1

INVENTORS,
Benjamin A. Branch
George Schnurr
By A. J. Martell
ATTORNEY.

July 24, 1928.
B. A. BRANCH ET AL
1,678,279
SAW FILING MACHINE
Filed Feb. 15, 1927
2 Sheets-Sheet 2
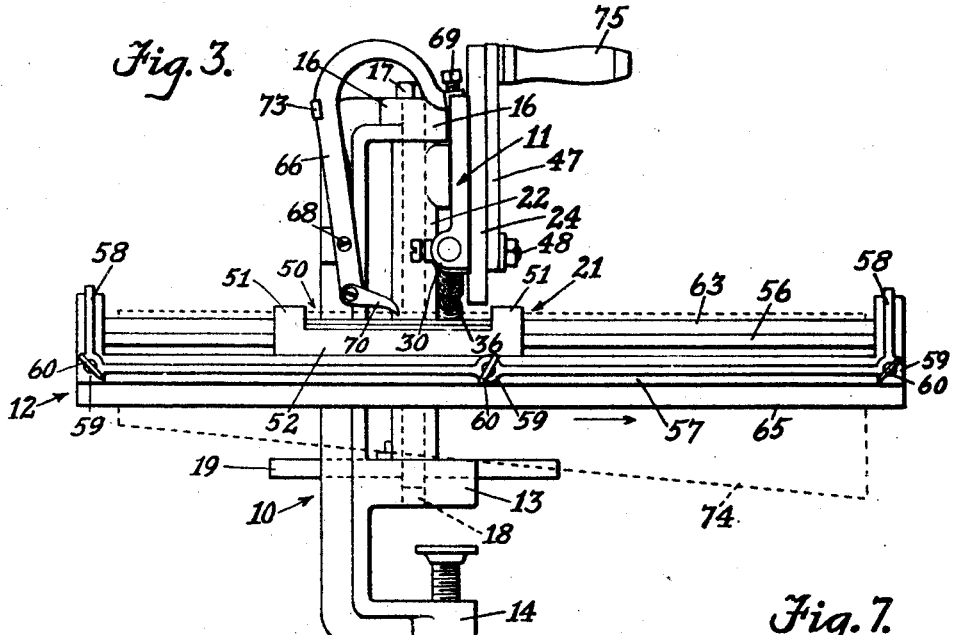
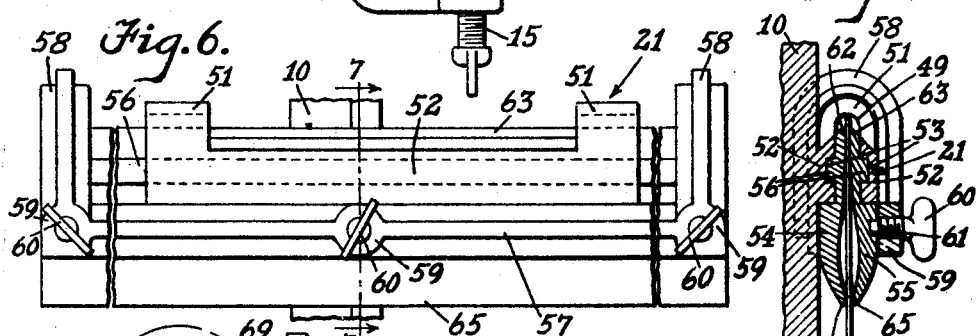
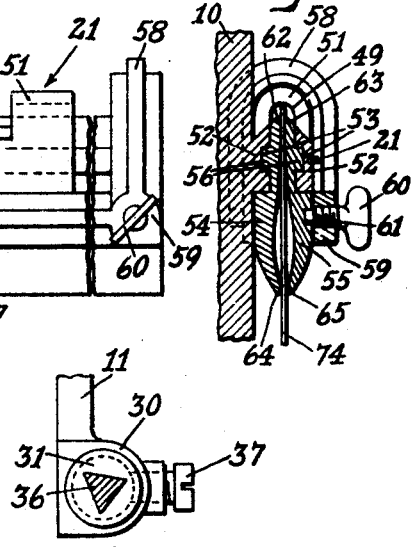
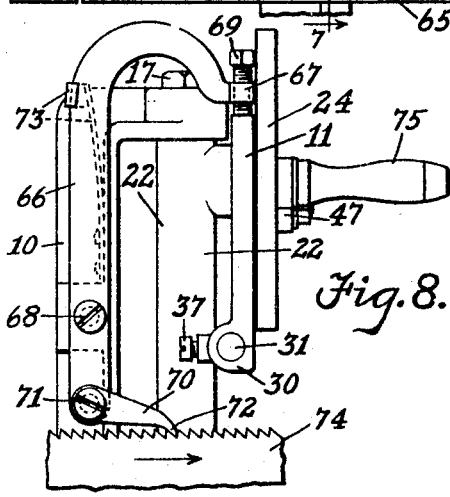
INVENTORS,
Benjamin A. Branch
George Schnurr
ATTORNEY.

Patented July 24, 1928.

1,678,279

UNITED STATES PATENT OFFICE.

BENJAMIN A. BRANCH AND GEORGE SCHNURR, OF LONG BEACH, CALIFORNIA.

SAW-FILING MACHINE.

Application filed February 15, 1927. Serial No. 168,377.

Our invention relates to saw filing devices and more particularly to a saw-filing machine.

The primary object of our invention is to provide a machine for filing saws whereby the filing may be done, quickly and accurately, by an unskilled workman, by the mere operation of a crank.

A further object is to provide a saw-filing machine which readily may be adjusted for saws of different types and sizes and for saws of different fineness or points per inch.

A further object is to provide a saw-filing machine of the character described that is made in parts which may be assembled and attached to a work bench, table or the like for use, or may be disassembled and packed in a chest for storage or shipment.

Other objects and advantages will appear hereinafter and while we show herewith and will describe a preferred form of construction, we desire it to be understood that we do not confine ourselves to such preferred form but that various changes and adaptations may be made therein without departing from the spirit of our invention as hereinafter claimed.

Referring to the drawings which accompany this specification and form a part thereof—

Fig. 1 is a plan view of our saw-filing machine.

Fig. 2 is a side view of the machine shown in Fig. 1.

Fig. 3 is a front view of the machine shown in Figs. 1 and 2.

Fig. 4 is a sectional view of the machine shown in Figs. 1, 2 and 3, the section being taken on line 4—4 of Fig. 2.

Fig. 5 is another sectional view of the machine, taken on line 5—5 of Fig. 2.

Fig. 6 is an enlarged view of the saw holding device of our machine, parts thereof being shown broken away to conserve space.

Fig. 7 is a sectional view of the saw holding device shown in Fig. 6, the section being taken on line 7—7 of that figure.

Fig. 8 is an enlarged fragmentary view of our saw-filing machine showing the saw shifting mechanism thereof in an intermediate position.

Fig. 9 is an enlarged fragmentary view of the front end of the file frame, showing the file chuck and a file held therein, the file being shown in section on line 9—9 of Fig. 2.

Considering the drawings more in detail, it will be seen that our saw-filing machine consists primarily of a supporting frame 10, and a file frame 11 and a saw carriage 12 mounted on the supporting frame so as to operate in approximately right angled relation to one another. The supporting frame is an upright structure having an upper jaw 13 and a lower jaw 14, the latter of which is equipped with a clamping screw 15, whereby the machine may be clamped on a table or work-bench. The upper end of the supporting frame terminates in a bearing 16 which overhangs upper jaw 13 and which is adapted to receive a vertical pivot-bolt 17, the lower end of which extends into an aperture 18 in upper jaw 13 adapting it to serve as the lower bearing to said pivot-bolt. A horizontal sector-plate 19 having an arcuate slot 20 concentric with the axis of said pivot bolt 17, is formed on one side of upper jaw 13 and a guide-rail 21 is rigidly fixed on the supporting frame, on the opposite side thereof from said sector plate and in vertically spaced relation to the latter, said guide rail extending horizontally in parallel relation to the supporting frame.

A vertical sleeve 22, adapted to receive pivot-bolt 17 and to turn thereon, is held between bearing 16 and upper jaw 13 by said pivot bolt, said sleeve 22 having a pivot pin 23 fixed in one side thereof, near its upper end and at right angles to its axis. A wheel or disc 24 having a central opening to receive pivot pin 23 and an eccentric hub 25 on one side, the side adjacent sleeve 22, is mounted on pin 23 and is held thereon by a nut 26, the face of disc being recessed as at 27 to receive the nut so that it is maintained flush therewith. A crank pin 28 is fixed in disc 24, in radial but extended alignment with the longest radius of eccentric hub 25, so as to project from the recessed face of said disc 24.

The thickness of file frame 11 corresponds to the length of hub 25 and it is made with a longitudinal slot 29, the width of which corresponds to the diameter of hub 25. When the machine is being assembled, file frame 11 is placed between sleeve 22 and disc 24, with hub 25 projecting through slot 29. This arrangement permits an endwise movement of file frame 11 on hub 25 in transverse relation to frame 10 and at right angles or somewhat oblique angles to guide-rail 21, as will presently appear. The lower side of file frame 11 is equipped with a bearing 30 on its front end, which holds a chuck 31 and a screw-threaded bearing 32, on its rear end, in which works a bolt 33, said bolt 33 and bearing 32 being co-axial with said chuck 31 and bearing 30. The rear end of said bolt 33 is equipped with wings 34, by which it may be turned, and the front end is recessed to receive the pointed end 35 of the usual saw file 36. Chuck 31 which is recessed to receive the triangular end of file 36 is turnable in bearing 30 and the latter is provided with a set screw 37 whereby chuck 31 may be clamped therein to hold file 36 in any angular position about the common axis of bearings 30 and 32.

A lateral extension 38 is formed on the upper end of sleeve 22, at right angles to pivot pin 23, which serves to connect it with a vertical leg 39, which has a return bend on its upper end, there being a space 40 between said leg 39 and its down-turned end 41 slightly greater than the thickness of file frame 11 which is placed so that its upper edge moves therein. Downturned end 41 of leg 39 is of sufficient length to extend below slot 29 when frame 11 is in place and a roller disc 42, having a diameter equal to hub 25 and a thickness equal to file frame 11, is centrally pivoted on a pin 43 extending across space 40 and through slot 29, of file frame 11, with its ends fixed in leg 39 and downturned end 41. The lower end of leg 39 has a right-angled bend which forms a foot 44 adapted to rest on sector plate 19 directly over slot 20 therein, and said foot 44 has an aperture 45 in vertical alignment with slot 20, through which aperture and slot a clamping-bolt 46 extends, whereby said foot 44 may be clamped to said sector plate 19 to hold leg 39 and file frame 11 in different angular positions with reference to frame 10 and guide rail 21.

File frame 11 thus mounted, is movable longitudinally on hub 25 and roller 42, the former of which produces a vertical rocking movement thereof about the latter, as disc 24 is turned. A connecting rod 47 extends between crank-pin 28, which turns in one end thereof, and a pivot-pin 48, fixed in the rear end of file frame 11 and causes an endwise movement of the latter, as disc 24 is turned, approximately equal to the diameter of disc 24. It is evident that by this arrangement the file frame is firmly held from tipping sidewise, while it is reciprocated longitudinally and its front end is lifted and lowered alternately by hub 25 turning with disc 24. Furthermore, it is evident that the file frame turns with leg 39 and disc 24 on sleeve 22, about pivot-bolt 17 so that it may be made to operate at different angles to guide rail 21.

Guide rail 21 has a longitudinal vertical groove 49, extending from its lower almost to its upper edge, and the middle portion of its upper edge is cut away, as at 50 (see Fig. 3) so that end portions 51 only are left to hold the side parts 52 together. Opposite grooves 53 are cut longitudinally in adjacent faces of side parts 52 as is clearly shown in Fig. 7.

The saw carriage 12 is equipped with clamping members 54 and 55 and is adapted to be mounted on said guide 21 so as to travel longitudinally thereon, said clamping members having longitudinal ridges or tongues 56 adapted to run in grooves 53 of the guide rail. Clamping member 54, which is the inner clamping member adjacent supporting frame 10, is made integral with the saw carriage which consists of a side-bar 57 connected to said clamping member 54 by end yokes 58 adapted to pass over end portions 51 of guide rail 21. Bosses 59, adapted to receive thumb-screws 60, are formed on side-bar 57. Clamping member 55 is separate from saw carriage 12 and is provided with recesses 61 to receive the ends of thumb-screws 60.

The upper edges of clamping members 54 and 55 are formed into complementary jaws 62 and 63 adapted to grip a saw blade in the usual way, and their lower edges, which extend below side bar 57 of the saw carriage, are slightly curved to form complementary fulcrum edges 64 and 65 which make contant with the sides of the saw blade along a line in spaced relation to jaws 62 and 63, when clamping member 55 is pressed against clamping member 54 by thumb screws 60. The saw carriage and clamping members may be made of any convenient length for band saws or may be made long enough to accommodate hand saws of the usual length, so that the whole length of the saw may be filed without resetting the blade in the clamping members of the carriage.

A shifting lever 66, having its upper end curved and provided with a screw-threaded bearing 67, is pivoted near its lower end to supporting frame 10 as at 68. An adjustable screw 69 extending through bearing 67 makes contact with the upper edge of file frame 11, as it moves upwardly, causing the upper end of shifting lever 66 to swing to the left whereby the lower end thereof is caused to swing to the right. A pawl 70 is pivotally attached as at 71, to the lower end of shifting lever 66, said pawl having a downturned and somewhat pointed end 72 adapted to drop into the notches between the teeth of a saw held in saw carriage 12 and to shift the saw and carriage toward the right in guide-rail 21, as shifting lever 66 is operated. A restoring spring 73, engaging the upper end of shifting lever 66 so as to return it to its normal vertical position, is fastened to supporting frame 10.

The operation of our saw filing machine readily will be understood by reference to Figs. 1, 2, 3 and 8. A saw 74 is clamped in saw carriage 12 in the position indicated by dotted lines in Fig. 3, and the carriage is shifted to the left as far as guide rail 21 will permit. The file is placed in file frame 11 and fixed in the correct angular position with reference to the saw teeth by tightening set screw 37 to hold chuck 31 from turning in bearing 30, and file frame 11 is set in the correct angular position with reference to the saw blade by shifting foot 44 on sector plate 19, and tightening bolt 46 to hold leg 39 and associated parts in that position. Having thus properly adjusted the saw and file in their correct, relative positions in the machine and set contact screw 69 to provide the proper amount of shifting, it is necessary only to turn disc 24 by means of handle 75, fixed on crank pin 28.

It is evident that when the machine is thus operated the file will be brought down on the saw edge during the forward movement of the file frame, as indicated in dotted lines in Fig. 2, and will be lifted well above the saw edge during the backward movement of the file frame, as shown in full lines in the same figure. It is further evident that as the file frame is lifted it will actuate shifting lever 66 to shift the saw to the right a pre-determined distance, usually the distance spanned by two saw teeth. When one side of the saw teeth has been filed throughout the length of the saw the saw carriage is again shifted to its extreme left position, the file and file frame are reset at a proper angle for the other side of the saw teeth and the operation is repeated.

When the machine is to be shipped or stored the file frame and its associated parts may be removed from the supporting frame 40 by lifting pivot bolt 17 clear of sleeve 22 and loosening bolt 46 to release foot 44. The saw carriage may likewise be detached from guide rail 21, by turning thumb-screws 60 back and removing the clamping members from slot 49, first member 55 and then member 54.

Having thus illustrated and described our invention, we claim:

In a saw filing device of the character described, the combination, with the main frame, horizontal saw-carrying frame, and reciprocatory file-carrying frame; of angularly adjustable guiding means for said file-carrying frame, said adjustable guiding means comprising a vertical sleeve, a bolt within said sleeve to pivotally secure it to said main frame, a radial pin fixed in one side of said sleeve, rotary means mounted on said radial pin and operatively connected with said file-carrying frame to reciprocate the latter, a lateral extension projecting from the upper portion of said sleeve, a vertical leg with which said extension is provided, and adjustable securing means at the lower end of said leg to provide for an arcuate adjustment of said leg with relation to said sleeve, there being two guides for the file-carrying frame which are in fixed relation to said leg and sleeve, one of said guides being located adjacent to said sleeve, and the other of said guides, being on said extension of said sleeve in spaced relation to the latter.

BENJAMIN A. BRANCH.
GEORGE SCHNURR.